(12) United States Patent
Cha et al.

(10) Patent No.: US 12,301,053 B2
(45) Date of Patent: May 13, 2025

(54) MOTOR ASSEMBLY HAVING A PLURALITY OF CORES

(71) Applicant: LG Electronics Inc., Seoul (KR)

(72) Inventors: Jinwook Cha, Seoul (KR); Chaseung Jun, Seoul (KR); Jaehoon Jeong, Seoul (KR); Charyeom Park, Seoul (KR)

(73) Assignee: LG Electronics Inc., Seoul (KR)

(*) Notice: Subject to any disclaimer, the term of this patent is extended or adjusted under 35 U.S.C. 154(b) by 277 days.

(21) Appl. No.: 17/921,843

(22) PCT Filed: Sep. 16, 2020

(86) PCT No.: PCT/KR2020/012482
§ 371 (c)(1),
(2) Date: Oct. 27, 2022

(87) PCT Pub. No.: WO2021/221240
PCT Pub. Date: Nov. 4, 2021

(65) Prior Publication Data
US 2023/0163645 A1    May 25, 2023

(30) Foreign Application Priority Data
Apr. 27, 2020 (KR) .................. 10-2020-0050843

(51) Int. Cl.
*H02K 1/14* (2006.01)
*H02K 1/24* (2006.01)
*H02K 7/00* (2006.01)

(52) U.S. Cl.
CPC .................. *H02K 1/14* (2013.01); *H02K 1/24* (2013.01); *H02K 7/003* (2013.01)

(58) Field of Classification Search
CPC .............. H02K 1/14; H02K 1/24; H02K 7/003
USPC .................................................. 310/216.091
See application file for complete search history.

(56) References Cited

U.S. PATENT DOCUMENTS

2012/0139385 A1* 6/2012 Sawada ................. H02K 1/148
                                              310/216.074
2017/0170697 A1* 6/2017 Locke .................... H02K 1/143
(Continued)

FOREIGN PATENT DOCUMENTS

DE    102007021946    11/2007
DE    102011052131    1/2013
(Continued)

OTHER PUBLICATIONS

International Search Report and Written Opinion in International Appln. No. PCT/KR2020/012482, dated Jan. 22, 2021, 17 pages (with English translation).
(Continued)

*Primary Examiner* — Rashad H Johnson
(74) *Attorney, Agent, or Firm* — Fish & Richardson P.C.

(57) ABSTRACT

A motor assembly includes a shaft configured to form a rotational axis of a motor, a rotor coupled to the shaft, and a plurality of cores provided along the circumference of the rotor and configured to form a magnetic path. The cores are spaced apart from the outer circumferential surface of the rotor by a predetermined distance and configured to surround at least a portion of the outer circumferential surface of the rotor, and each comprise: a pole shoe having a first surface parallel to the radial direction of the rotor; and a pole arm extending from the pole shoe toward the radially outer side of the rotor. Among the plurality of cores, the first surfaces formed on the pole shoes of adjacent cores are symmetrical with respect to the radial direction of the rotor.

12 Claims, 4 Drawing Sheets

(56) References Cited

U.S. PATENT DOCUMENTS

| | | | |
|---|---|---|---|
| 2018/0366997 A1 | 12/2018 | Le Mentec et al. | |
| 2019/0140493 A1* | 5/2019 | Takahashi | A45D 20/12 |
| 2021/0021169 A1* | 1/2021 | Hong | H02K 3/38 |
| 2021/0021171 A1* | 1/2021 | Hong | H02K 3/345 |
| 2021/0028663 A1* | 1/2021 | Hong | H02K 3/18 |
| 2021/0066976 A1* | 3/2021 | Bae | H02K 3/345 |
| 2022/0149674 A1* | 5/2022 | Jang | H02K 3/12 |
| 2023/0077214 A1* | 3/2023 | Kim | F04D 29/426 |
| 2023/0179031 A1* | 6/2023 | Cha | H02K 7/003 |
| | | | 310/179 |
| 2023/0188005 A1* | 6/2023 | Jeong | H02K 9/06 |
| | | | 310/62 |
| 2024/0297544 A1* | 9/2024 | Goodwin | A47L 9/22 |

FOREIGN PATENT DOCUMENTS

| | | |
|---|---|---|
| EP | 3316451 | 5/2018 |
| EP | 4148956 | 3/2023 |
| KR | 20150142918 | 12/2015 |
| KR | 20160090522 | 8/2016 |
| KR | 10-2020-0013047 A | 2/2020 |
| WO | WO 2001/011756 | 2/2001 |

OTHER PUBLICATIONS

Extended European Search Report in European Appln. No. 20933100.8, mailed on May 13, 2024, 10 pages.

Office Action in Korean Appln. No. 10-2020-0050843, mailed on Aug. 22, 2024, 14 pages (with English translation).

* cited by examiner

MOTOR ASSEMBLY HAVING A PLURALITY OF CORES

CROSS-REFERENCE TO RELATED APPLICATIONS

This application is a National Stage application under 35 U.S.C. § 371 of International Application No. PCT/KR2020/012482, filed on Sep. 16, 2020, which claims the benefit of Korean Application No. 10-2020-0050843, filed on Apr. 27, 2020. The disclosures of the prior applications are incorporated by reference in their entirety.

TECHNICAL FIELD

The present disclosure relates to a motor assembly.

BACKGROUND ART

In general, a motor is a device that implements a driving force by an interaction between a stator and a rotor. Basically, overall structures of the stator and the rotor are the same.

However, types of motors are distinguished based on a principle that the rotor rotates by the interaction between the stator and the rotor. In addition, the types of motors are also distinguished based on a type or a phase of power applied to a stator coil. In addition, the types of motors are also distinguished based on a method the stator coil is wound. For example, there are a DC variable voltage motor, an AC 3-phase induction motor, and the like.

A general structure of the motor will be described. A shaft forming a rotating shaft, the rotor coupled to the shaft, and a stator core fixed inside a housing are arranged, and the stator is installed at a predetermined spacing along a circumference of the rotor.

In addition, teeth are arranged on the stator core, and coils are wound around the teeth so as to form a rotating magnetic field and induce an electrical interaction with the rotor to induce rotation of the rotor.

Coil winding schemes are divided into concentrated winding and distributed winding. The concentrated winding is a winding scheme in which the coils are concentrated and wound in one slot, and the distributed winding is a winding scheme in which the coils are divided and wound in two or more slots.

In the case of the concentrated winding, a copper loss may be reduced while reducing an amount of winding compared to the distributed winding, but a change in magnetic flux density is great and a core loss or an iron loss, that is, a power loss of an iron core increases because the coils are excessively concentrated in the slot. For this reason, the coil wound in the concentrated winding scheme is generally used in a small motor.

Recently, a motor used in various home appliances (for example, a hair dryer, a vacuum cleaner, and the like) has undergone various developments for securing ease of assembly, securing a flow path area, and solving a spatial constraint that are required in response to a demand for miniaturization and performance improvement.

The cited invention (U.S. Ser. No. 16/011,823, published on Dec. 20, 2018) discloses a brushless motor including a C-shaped stator core. The C-shaped stator core forms a protrusion for being in contact with a frame to suppress a radial movement. The C-shaped stator core has a structure that may reduce leakage magnetic flux and have a short magnetic flux path.

However, because the C-shaped stator core is composed of two pole arms and a yoke connecting the two pole arms to each other, in order to meet required output of the miniaturized motor, it is necessary to secure a gap between the two pole arms considering a diameter of the coil and the number of turns of the coil.

DISCLOSURE

Technical Problem

Therefore, the present disclosure is to solve the above-mentioned problem.

One of various tasks of the present disclosure is to provide a structure that may reduce a weight of a motor and secure a space inside the motor by independently constructing a stator core.

One of various tasks of the present disclosure is to provide a C-shaped independent core with an improved structure for increasing an output of a small motor to which the C-shaped independent core is applied.

One of various tasks of the present disclosure is to provide a motor assembly including a structure that may secure a slot area for efficiency improvement within a limited diameter when using a C-shaped independent core.

One of various tasks of the present disclosure is to provide a motor assembly that may secure a slot width of a C-shaped independent core as a pole shoe with an improved structure is applied thereto.

Technical Solutions

Various embodiments for solving the problem of the present disclosure provide a motor assembly including a C-shaped independent core with an improved structure that may increase a flux linkage by changing a shape of a pole shoe of the C-shaped independent core, and may secure a slot area.

An embodiment of the present disclosure provides a motor assembly including a C-shaped independent core with an improved structure that may secure a slot area of the C-shaped independent core by improving a shape such that a curvature of a yoke of the C-shaped independent core corresponds to a curvature of an inner circumferential surface of a motor housing.

An embodiment of the present disclosure provides a motor assembly including a shaft for forming a rotating shaft of a motor, a rotor coupled to the shaft, and a plurality of cores arranged along a circumference of the rotor so as to form a magnetic path, wherein each core includes pole shoes spaced apart from a circumferential surface of the rotor by a predetermined distance and surrounding at least a portion of the circumferential surface of the rotor, wherein each pole shoe has a first surface formed parallel to a radial direction of the rotor, and pole arms respectively extending from the pole shoes outwardly in the radial direction of the rotor, wherein first surfaces formed in respective pole shoes of adjacent cores among the plurality of cores are symmetrical with each other with respect to the radial direction of the rotor.

The pole arms may include a first pole arm and a second pole arm spaced apart from the first pole arm to correspond to a width of the core, and the pole shoes may include a first pole shoe formed on one side of the first pole arm and a second pole shoe formed on one side of the second pole arm. The core may further include a connecting portion for connecting the other side of the first pole arm and the other side of the second pole arm to each other.

In one example, the motor assembly may further include a motor housing for accommodating the motor therein, and the connecting portion may connect the other side of the first pole arm and the other side of the second pole arm to each other while forming a curvature corresponding to an inner circumferential surface of the motor housing.

Each pole shoe may include a second surface extending from one end of the first surface toward each pole arm extending from each pole shoe, and a third surface for forming a curvature corresponding to the circumferential surface of the rotor at the other end of the first surface.

Second surfaces of the adjacent cores among the plurality of cores may form a first angle therebetween, a first reference line extending along the radial direction of the rotor and passing through a center of a space between the first pole shoe and the second pole shoe and a second reference line extending along the radial direction of the rotor and passing through a center of a space between the first surfaces of the adjacent cores among the plurality of cores may form a second angle therebetween, and the first angle may be greater than the second angle.

An angle between a first reference line extending along the radial direction of the rotor and passing through a center of a space between the first pole shoe and the second pole shoe and a second reference line extending along the radial direction of the rotor and passing through a center of a space between the first surfaces of the adjacent cores among the plurality of cores may be 60 degrees.

In one example, a width of the first surface may be smaller than a width of the pole arm. A coil may be wound on each of the first pole arm and the second pole arm. Alternatively, a coil may be wound on the connecting portion.

An embodiment of the present disclosure provides a motor assembly including a shaft for forming a rotating shaft of a motor, a rotor coupled to the shaft, and a plurality of cores arranged along a circumference of the rotor so as to form a magnetic path, wherein each core includes pole shoes spaced apart from a circumferential surface of the rotor by a predetermined distance and surrounding at least a portion of the circumferential surface of the rotor, and pole arms respectively extending from the pole shoes outwardly in a radial direction of the rotor, wherein pole shoes of adjacent cores among the plurality of cores respectively have surfaces symmetrical to each other with respect to a virtual reference line orthogonal to the rotating shaft and parallel to the virtual reference line.

The pole arms may include a first pole arm and a second pole arm spaced apart from the first pole arm to correspond to a width of the core, and the pole shoes may include a first pole shoe formed on one side of the first pole arm and a second pole shoe formed on one side of the second pole arm. The core may further include a connecting portion for connecting the other side of the first pole arm and the other side of the second pole arm to each other.

In one example, the motor assembly may further include a motor housing for accommodating the motor therein, and the connecting portion may connect the other side of the first pole arm and the other side of the second pole arm to each other while forming a curvature corresponding to an inner circumferential surface of the motor housing.

Each of the characteristics of the above-described embodiments may be implemented in combination in other embodiments as long as it is not contradictory or exclusive to other embodiments.

In addition, provided is a motor assembly including a shaft for forming a rotating shaft of a motor, a rotor coupled to the shaft, and a plurality of cores arranged along a circumference of the rotor so as to form a magnetic path, wherein each core includes each pole shoe including a first surface parallel to a radial direction of the rotor, a second surface extending from the first surface, and a third surface extending from the first surface and having a curvature corresponding to a circumferential surface of the rotor, each pole arm extending outwardly in the radial direction of the rotor from the second surface, and a connecting portion for connecting the pole shoe and the pole arm to each other, wherein the cores are arranged to be spaced apart from each other, wherein first surfaces of adjacent cores are arranged to be symmetrical with each other with respect to a second line forming a predetermined angle with a first reference line orthogonal to a rotating shaft of the shaft.

In addition, provided is the motor assembly in which the first line passes through a center of a space between the pole shoes of one of the plurality of cores.

In addition, provided is the motor assembly in which second surfaces of the adjacent cores form a first angle therebetween, the first line and the second line form a second angle therebetween, and the first angle is greater than the second angle.

In addition, provided is the motor assembly in which each core includes a first pole shoe disposed at one side thereof and a second pole shoe disposed at a side thereof opposite to the side where the first pole shoe is disposed.

In addition, provided is the motor assembly in which the first pole shoe and the second pole shoe are arranged to be spaced apart from each other.

In addition, provided is the motor assembly in which the cores are arranged to be spaced apart from each other at equal spacings.

Advantageous Effects

According to various embodiments of the present disclosure, as the three-phase C-shaped independent core is used, the leakage flux may be reduced and the short magnetic flux path may be included. In addition, the area between the pole arm and the pole arm for improving the efficiency may be secured within the limited diameter of the motor housing.

According to various embodiments of the present disclosure, as the structure of the C-shaped independent core is improved, the slot width of the C-shaped independent core may be increased, and at the same time, the limited space inside the motor housing may be effectively utilized.

The effects of the present disclosure are not limited to those described above, and other effects not mentioned will be clearly recognized by those skilled in the art from the description below.

BEST MODE

Hereinafter, a specific embodiment of the present disclosure will be described with reference to the drawings.

Following detailed description is provided to provide a comprehensive understanding of a method, an apparatus, and/or a system described herein. However, this is merely an example and the present disclosure is not limited thereto.

In describing embodiments of the present disclosure, when it is determined that a detailed description of a known technology related to the present disclosure may unnecessarily obscure the gist of the present disclosure, the detailed description will be omitted. In addition, terms to be described later, as terms defined in consideration of functions thereof in the present disclosure, may vary based on intentions of users and operators or customs. Therefore, the definition thereof should be made based on the content throughout this specification. Terms used in the detailed description are for illustrating the embodiments of the present disclosure only, and should not be restrictive. Unless explicitly used otherwise, the singular expression includes the plural expression. Herein, expressions such as "comprising" or "including" are intended to indicate certain features, numbers, steps, operations, elements, and some or combinations thereof, and should not be construed to exclude a presence or a possibility of one or more other features, numbers, steps, operations, elements, or some or combinations thereof other than those described.

In addition, in describing components of an embodiment of the present disclosure, terms such as first, second, A, B, (a), (b), and the like may be used. These terms are only for distinguishing the components from other components, and an essence, an order, or a sequence of the corresponding components are not limited by the terms.

Figure 1:
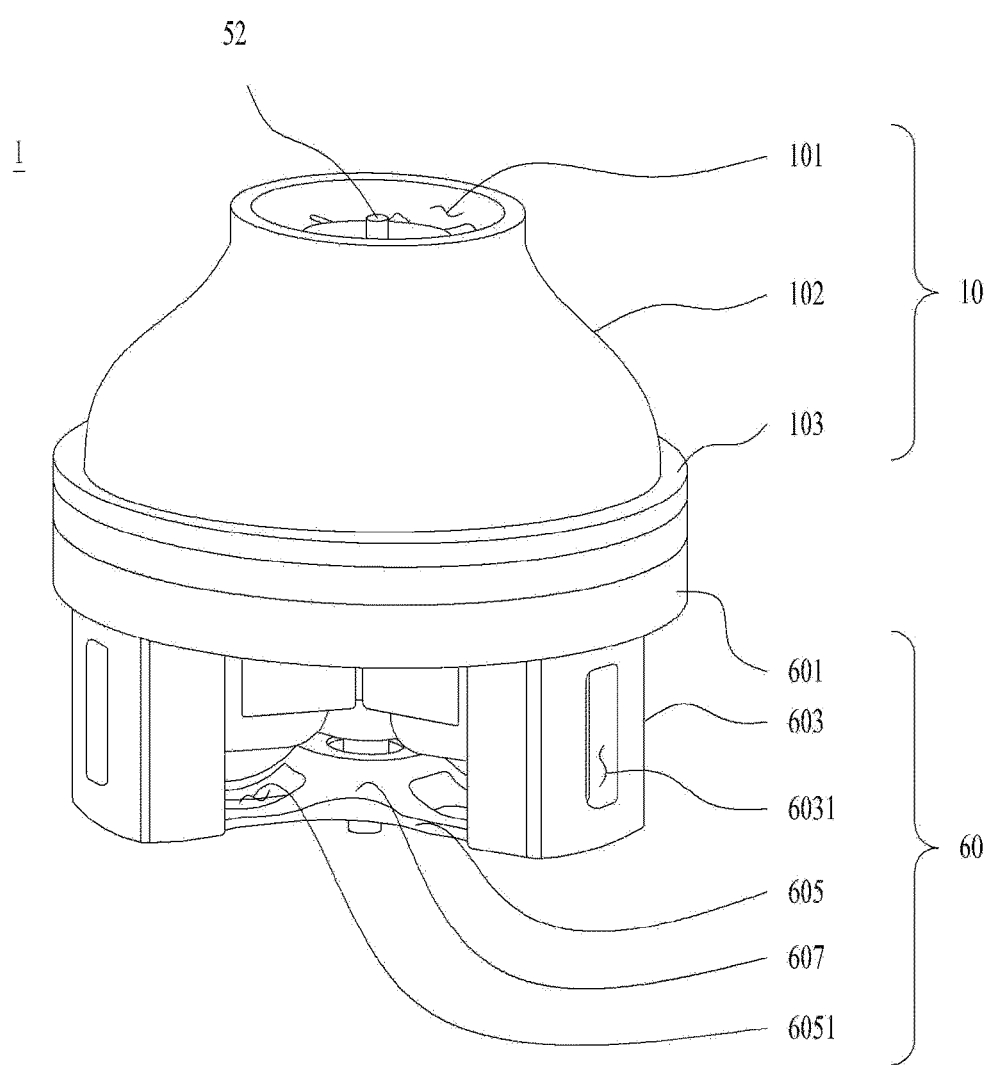
FIG. 1 is a perspective view of a motor assembly according to an embodiment of the present disclosure.
Figure 2:
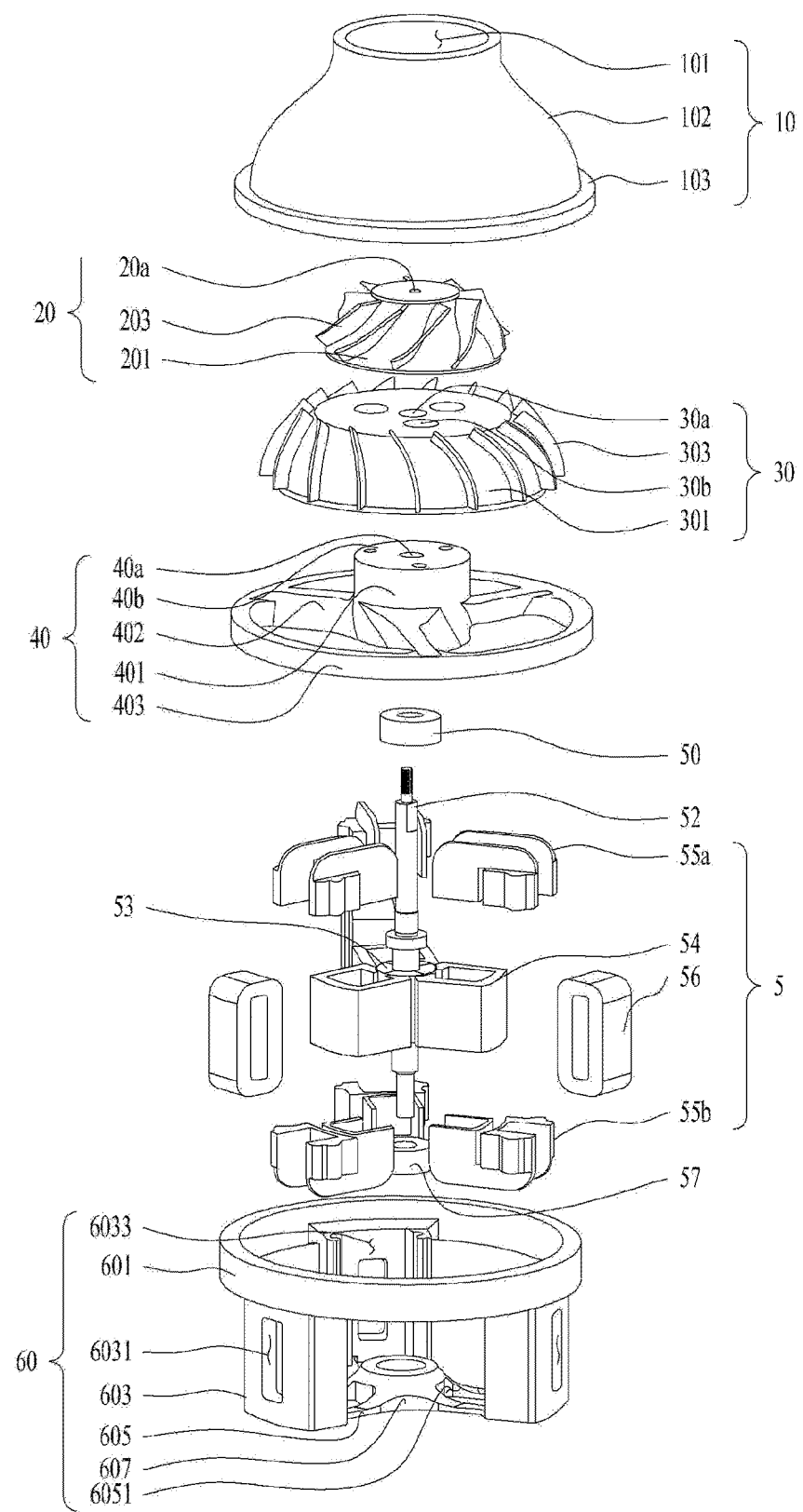
FIG. 2 is an exploded perspective view of a motor assembly according to an embodiment of the present disclosure.

FIG. 1 is a perspective view of a motor assembly according to an embodiment of the present disclosure, and FIG. 2 is an exploded perspective view of a motor assembly according to an embodiment of the present disclosure.

Hereinafter, a description will be made with reference to FIGS. 1 and 2.

A motor assembly 1 according to an embodiment of the present disclosure may be used in small household appliances. As an example, the motor assembly 1 may be used in a vacuum cleaner. There are two types of vacuum cleaners: a canister type in which a nozzle for sucking dust and a dust collector for storing the dust are connected to each other with a hose, and a handy type in which the nozzle and the dust collector are formed as a single module. In the case of the handy type, because cleaning is performed while a user grips the entire cleaner module, overall miniaturization and weight reduction of the vacuum cleaner are required.

The motor assembly 1 may be applied to the small home appliances to meet the above-mentioned needs.

The motor assembly 1 of the present embodiment may include a shroud 10, an impeller 20, a diffuser 30, a housing cover 40, a core assembly 5, and a motor housing 60.

The shroud 10 may suck and guide external air. In addition, the shroud 10 may form an upper outer appearance of the motor assembly.

The shroud 10 may include a sucking portion 101, an inclined portion 102, and a third coupling portion 103. The sucking portion 101 may be formed in a hollow ring shape at an upper end of the shroud 10. Because the external air is introduced via the sucking portion 101, a diameter of the sucking portion 101 may be designed in consideration of a diameter of the impeller 20.

The shroud 10 may include the inclined portion 102 extending while forming a gentle curve from the sucking portion 101. The inclined portion 102 may be formed in a shape in which a diameter thereof increases from the sucking portion 101 in an axial direction. The inclined portion 102 may form the gentle curve in order to minimize an element that may act as a resistance to a flow of air introduced via the sucking portion 101.

The sucking portion 101 may be formed at one end of the inclined portion 102, and the third coupling portion 103 may be formed at the other end of the inclined portion 102. The third coupling portion 103 may extend outwardly in a radial direction from the other end of the inclined portion 102 to have a predetermined thickness. The third coupling portion 103 may be in contact with one surface of a second coupling portion 403 of a housing cover 40 to be described later to allow the shroud 10 and the housing cover 40 to be coupled to each other. In one example, various structures for coupling of the third coupling portion 103 and the second coupling portion 403 may be applied within the thickness of the third coupling portion 103.

The impeller 20 may include a through-hole 20a, a blade 203, and an impeller body 201. The impeller 20 may be installed at one side of a shaft 52. In more detail, the impeller 20 may be installed at a side opposite to the other side of the shaft 52 where a rotor 53 is installed based on an axial direction of the shaft 52.

As the shaft 52 forming a rotating shaft of a motor is coupled to the through-hole 20a, the impeller 20 may be fixed at one side of the shaft 52. The impeller 20 may be fixed to the shaft 52 in various schemes, for example, by a screw fastening scheme.

The impeller body 201 may be formed in a shape in which a circumference increases along the axial direction of the shaft 52. The blade 203 may extend outwardly in the radial direction of the shaft 52 from an outer surface of the impeller body 201. The blade 203 may be disposed along a longitudinal direction of the impeller body 201. The blades 203 may be disposed to be spaced apart from each other along a circumferential direction on the outer surface of the impeller body 201.

The impeller 20 of the present embodiment may be formed as a mixed flow impeller that sucks in gas such as air in the axial direction of the shaft 52 and then discharges the gas in an inclined direction between a centrifugal direction and the axial direction.

That is, the gas flowing into the shroud 10 via the sucking portion 101 may be guided to the motor housing 60 along the outer surface of the impeller body 201 by rotation of the blade 203. However, embodiments of the present disclosure are not limited thereto. The impeller 20 may be formed as a centrifugal impeller that sucks in gas in the axial direction and discharges the gas in a centrifugal direction. However, in the following, for convenience of illustration, the case in which the impeller 20 is the mixed flow impeller will be mainly described.

The diffuser 30 may include a through-hole 30a, a fastening hole 30b, a diffuser body 301, and a vane 303. The diffuser 30 may convert a dynamic pressure of the gas passing through the impeller 20 into a static pressure.

The diffuser 30 may be coupled to the shaft 52 by inserting the shaft 52 into the through-hole 30a, and the diffuser 30 may be disposed between the impeller 20 and the rotor 53. Therefore, the through-hole 30a may be defined at a position in communication with the through-hole 20a of the impeller 20 when the impeller 20 and the diffuser 30 are coupled to the shaft 52. In addition, the fastening hole 30b is a component for coupling the diffuser 30 to the housing cover 40.

The diffuser body 301 may be formed in a shape in which a circumference increases along the axial direction of the shaft 52. The vane 303 may extend outwardly in the radial direction of the shaft 52 from an outer surface of the diffuser body 301. The vane 303 may be disposed along a longitudinal direction of the diffuser body 301. The vanes 303 may be disposed to be spaced apart from each other in the circumferential direction on the outer surface of the diffuser body 301.

Based on such structure, the gas flowing into the shroud 10 via the sucking portion 101 may be guided to a space between the shroud 10 and the diffuser 30 by the impeller 20, and the gas flowing into the space between an inner surface of the shroud 10 and the diffuser 30 may be guided toward the core assembly 5 by the plurality of vanes 303.

The housing cover 40 may include a through-hole 40a, a fastening hole 40b, a second bearing housing 401, a second bridge 402, and a second coupling portion 403.

The through-hole 40a is a component into which the shaft 52 is inserted. The through-hole 40a may be defined at a position in communication with the through-hole 20a of the impeller and the through-hole 30a of the diffuser when the housing cover 40, the diffuser 30, and the impeller 20 are coupled to the shaft 52.

The fastening hole 40b is a component for coupling the diffuser 30 and the housing cover 40 to each other. The fastening hole 40b may be defined at a position in communication with the fastening hole 30b of the diffuser when the diffuser 30 is coupled to the housing cover 40.

The second bearing housing 401 is a component for accommodating therein a second bearing 50 for supporting one side of the shaft 52. It is preferable that the second bearing housing 401 is disposed at a center of the housing cover 40. The second bearing 50 may be, for example, a ball bearing, and the shaft 52 may have a step recessed inwardly in the radial direction in the outer surface thereof so as to support the second bearing 50. Alternatively, in one example, the shaft 52 may have a step protruding outwardly in the radial direction from the outer surface thereof so as to support the second bearing 50.

The second coupling portion 403 extends outwardly in the radial direction of shaft 52 to have a predetermined thickness. One surface of the second coupling portion 403 may be in contact with the third coupling portion 103 of the shroud 10, and the other surface of the second coupling portion 403 may be in contact with a first coupling portion 601 of the motor housing 60 to couple the shroud 10, the housing cover 40, and the motor housing 60 to each other. In one example, various structures for the coupling described above may be applied within the thickness of the second coupling portion 403.

The second bridge 402 connects the second bearing housing 401 and the second coupling portion 403 to each other. A plurality of second bridges 402 may be arranged for structural stability of the housing cover 40, and may be formed to have a predetermined thickness so as to secure rigidity thereof.

When the plurality of second bridges 402 are arranged while having the predetermined thickness, the plurality of second bridges 402 may act as the resistance to the flow of the external air introduced via the sucking portion 101. Therefore, the second bridge 402 of the present embodiment forms a predetermined inclination along the longitudinal direction of the shaft 52. As the second bridge 402 is inclined, a portion acting as the resistance to the flow of the external air introduced via the sucking portion 101 may be minimized. In addition, by guiding the flow toward the core assembly 5, a heat generated as a current flows through a coil 56 may be cooled.

In one example, the diffuser 30 may be formed integrally with the housing cover 40. However, preferably, after being manufactured separately from the housing cover 40, the diffuser 30 may be fastened with the housing cover 40.

The rotor 53 may surround a portion of the outer surface of the shaft 52. The shaft 52 may rotate by an electromagnetic interaction between the rotor 53 and the core assembly 5. As the shaft 52 rotates, the impeller 20 fastened to the shaft 52 may also rotate together with the shaft 52. As the impeller 20 rotates, the external air may be sucked into the motor assembly 1.

The core assembly 5 may include a core 54, insulators 55a and 55b, and the coil 56. It is exemplified that the motor of the present embodiment is a brushless direct current motor (BLDC motor). Therefore, the core assembly 5 of the present embodiment may be disposed outwardly of the rotor 53.

The core 54 is disposed along a circumference of the rotor 53 so as to form a magnetic path, and a plurality of cores may be arranged. The core 54 of the present embodiment is an independent C-shaped core formed by two pole arms that are spaced apart from each other and extend in the radial direction of the shaft 52 and a yoke for connecting the two pole arms to each other.

The insulators 55a and 55b may be coupled to the core 54 to surround the pole arms and the yoke of the core 54 and insulate the core 54 and the coil 56 from each other. The insulators may be formed as a first insulator 55a and a second insulator 55b so as to be easily assembled to the core 54.

The motor housing 60 may include the first coupling portion 601, a core support 603, a first bridge 605, and a first bearing housing 607.

The first coupling portion 601, as a component to be coupled to the second coupling portion 403 of the housing cover 40 as described above, may be formed in a hollow ring shape. In addition, the core assembly 5 may be coupled to the motor housing 60 along the axial direction of the shaft 52 while extending through the first coupling portion 601.

The core support 603, as a component to support the core assembly 5, may extend along the longitudinal direction of the shaft 52 from the first coupling portion 601. A seating groove 6033 may be defined in a surface of the core support 603 facing the shaft 52. The core assembly 5 may be accommodated in the seating groove 6033.

A second hole 6031 may be defined in the core support 603. The heat generated as the current flows through the coil 56 may be dissipated via the second hole 6031, or the external air introduced via the sucking portion 101 may be discharged through the second hole 6031 via the core assembly 5, thereby cooling the core assembly 5.

The first bearing housing 607 is a component in which a first bearing 57 for supporting one side of the shaft 52 is accommodated. Therefore, the first bearing housing 607 is preferably formed at a center of the motor housing 60. The first bearing 57 may be, for example, the ball bearing. As the first bearing 57 and the second bearing 50 respectively support both sides of the shaft 52, the shaft 52 may rotate stably.

The first bridge 605 connects the first bearing housing 607 and the core support 603 to each other. A plurality of first bridges 605 may be arranged for structural stability of the motor housing 60, and may be formed to have a predetermined thickness so as to secure rigidity of the second bridge 402.

In addition, the first bridge 605 may have a first hole 6051 defined therein. The first hole 6051 may be defined within the thickness of the first bridge 605. When the plurality of first bridges 605 are arranged while having the predetermined thickness, the plurality of first bridges 605 may act as the resistance to the flow passing through an interior of the motor housing 60 along the longitudinal direction of the shaft 52. Therefore, in the first bridge 605 of the present embodiment, the first hole 6051 is defined along a longitudinal direction of the first bridge 605 to minimize a portion acting as the resistance to the flow, and at the same time, secure the rigidity of the motor housing 60.

Figure 3:
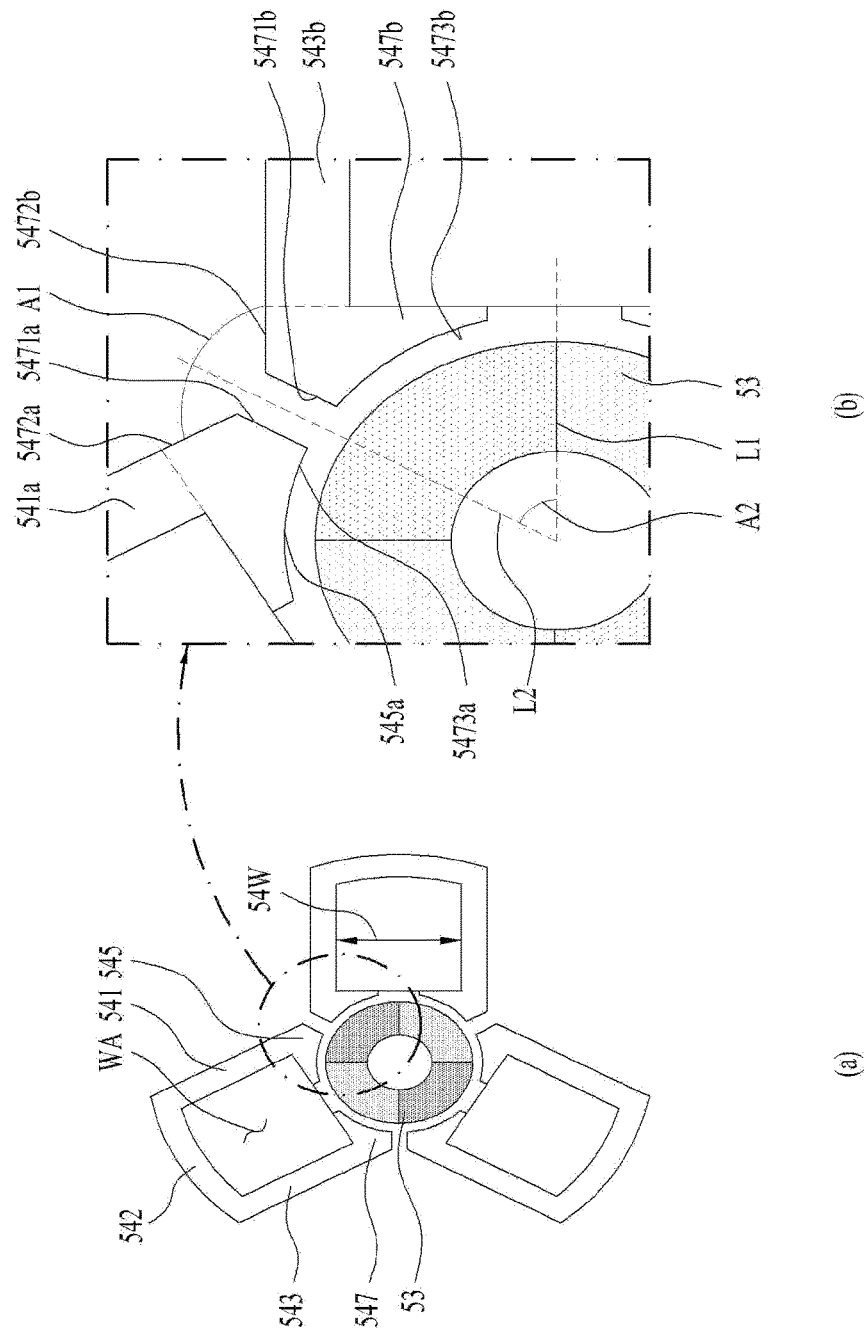
FIGS. 3 to 4 are cross-sectional views of a core and a rotor according to an embodiment of the present disclosure.
Figure 4:
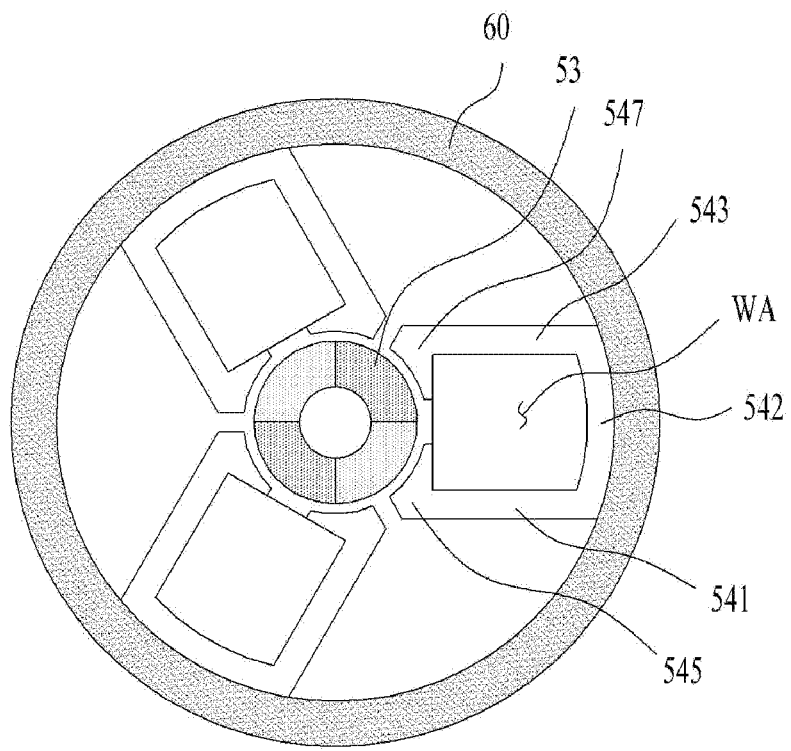

FIGS. 3 to 4 are cross-sectional views of a core and a rotor according to an embodiment of the present disclosure. Hereinafter, a description will be made with reference to FIGS. 3 and 4.

The core 54 according to an embodiment of the present disclosure may include a plurality of cores along the circumference of the rotor 53. In the present drawing, three independent cores along the circumference of the rotor 53 are illustrated.

The core 54 may include a first pole shoe 545 and a second pole shoe 547 that are spaced apart from an outer circumferential surface of the rotor 53 by a predetermined distance to surround at least a portion of the outer circumferential surface of the rotor 53 and form a first surface 5471 parallel to the radial direction of the rotor 53, a first pole arm 541 and a second pole arm 543 extending outwardly in the radial direction of the rotor 53 from the pole shoes 545 and 547, respectively, and a connecting portion 542 for connecting the first pole arm 541 and the second pole arm 543 to each other.

That is, the core 54 of the present embodiment is an independent C-shaped core including the two pole arms, a yoke for connecting the other sides of the pole arms to each other, and the pole shoes respectively formed on one sides of the pole arms. Therefore, the first pole arm 541 and the second pole arm 543 are spaced apart from each other corresponding to a width 54w of the core.

The pole shoe may be formed of the first surface 5471, a second surface 5472, and a third surface 5473. The first surface 5471 may be formed parallel to the radial direction of the rotor 53. More specifically, referring to (b) in FIG. 3, the first surface 5471 may extend along the radial direction of the rotor 53 and be formed parallel to a second reference line L2 passing through a center of the rotor 53. The second line L2, as a virtual reference line orthogonal to the rotating shaft of the shaft, may be defined as a line passing through a center of a space between first surfaces of adjacent cores among the plurality of cores.

In addition, a width of the first surface 5471 is preferably smaller than a width of the pole arm. Because when the width of the first surface 5471 is greater than the width of the pole arm, the width of the first surface 5471 should be directed toward the second surface 5472 when considering the predetermined distance at which the pole shoe and the rotor 53 are spaced apart from each other, which may increase leakage flux between the adjacent cores.

Accordingly, the width of the first surface 5471 may be smaller than the width of the pole arm, and accordingly, the second surface 5472 may extend from one end of the first surface 5171 toward the pole arm in a straight line. In addition, the third surface 5173 may form a curvature corresponding to the circumferential surface of the rotor 53 at the other end of the first surface 5171.

Relationships between the respective pole shoes and the respective pole arms of the adjacent cores will be described with reference to (b) in FIG. 3. The respective first surfaces of the cores may be formed symmetrical with each other with respect to the second line L2. More specifically, as the plurality of cores are arranged along the circumference of the rotor, a first pole shoes 545a of one of the among the plurality of cores may be disposed adjacent to a second pole shoe 547b of one of the remaining cores. Because the plurality of cores have the same shape and configuration, the cores will be distinguished from each other using "a" and "b" below to identify a component of each core.

As described above, the first pole shoe 545a and the second pole shoe 547b are spaced apart from the rotor 53 by the predetermined distance and are disposed adjacent to each other along the circumference of the rotor 53. A first surface 5471a of the first pole shoe may be disposed symmetrically to a first surface 5471b of the second pole shoe, and, may be preferably parallel to the second line L2. As the surfaces parallel to each other and facing each other are formed between the pole shoes of the adjacent cores as described above, the width 54W of the core may be increased while maintaining a flux linkage between the cores.

In addition, a first angle A1 is formed between a second surface 5472a of the first pole shoe and a second surface 5472b of the second pole shoe.

The first angle A1 may be larger than a second angle A2 to be described later. The second angle A2 may be defined as an angle between a first reference line L1 and the second line L2 extending along the radial direction of the rotor while passing through a center of a space between the first pole shoe 545 of one of the plurality of cores and the second pole shoe 547. The first line L1, as a virtual reference line orthogonal to the rotating shaft of the shaft, may be defined as a line passing through a center of the space between the first pole shoe 545 and the second pole shoe 547 of the cores.

In the present embodiment, the second angle A2 may preferably be 60 degrees. This is because the core of the present embodiment preferably has the three independent cores at equal spacings along the circumference of the rotor.

In one example, the connecting portion 542 may connect the other side of the first pole arm 541 and the other side of the second pole arm 543 to each other while forming a curvature corresponding to an inner circumferential surface of the motor housing 60. As the connecting portion 542 is formed with the curvature corresponding to the inner circumferential surface of the motor housing 60, the winding area WA of the core 54 may be further secured. In addition, unnecessary gaps that may occur in the connecting portion and the inner circumferential surface of the motor housing when the connecting portion connects the two pole arms to each other in a straight line may be prevented.

That is, as in the present embodiment, the connecting portion 542 may form the curvature corresponding to the inner circumferential surface of the motor housing 60, thereby not only effectively utilizing the inner space of the motor assembly, but also securing the winding area WA of the core.

The winding area WA of the core may mean an area of the coil that may be wound on the core. The area of the coil may be defined differently depending on the number of times the coil is wound on the core and a diameter of the coil. However, as described above, it is important to secure the winding area WA within the limited space for the miniaturization of the motor and the improvement of the motor performance.

As described above, the motor assembly of the present embodiment discloses the core of the improved structure that may secure the winding area WA. In one example, the winding area WA may be set differently depending on the size of the motor, but in a case of a motor of the same size, a width between the pole arm and the pole arm must be widened in order to increase the winding area WA.

In the present embodiment, because the first surfaces of the adjacent pole shoes are symmetrical with each other with respect to the second reference line L2 and are formed as parallel surfaces, the core width 54W may be effectively secured. In addition, as the connecting portion 542 forms the curvature corresponding to the inner circumferential surface of the motor housing 60, the core width 54W may be secured.

Although various embodiments of the present disclosure have been described in detail above, those with ordinary skill in the technical field to which the present disclosure belongs will understand that various modifications are possible with respect to the above-described embodiments without departing from the scope of the present disclosure. Therefore, the scope of rights of the present disclosure should not be limited to the described embodiments and should be defined by the claims to be described later as well as equivalents thereof.

The invention claimed is:

1. A motor assembly comprising:
 a motor configured to rotate a shaft;
 a rotor coupled to the shaft; and
 a plurality of cores arranged along a circumferential surface of the rotor and configured to define a magnetic path,
 wherein each of the plurality of cores includes:
  pole shoes that are spaced apart from the circumferential surface of the rotor and surround at least a portion of the circumferential surface of the rotor, each of the pole shoes having a first surface that is parallel to a radial direction of the rotor, and
  pole arms that respectively extend outward from the pole shoes in the radial direction of the rotor,
 wherein the pole arms include a first pole arm and a second pole arm that are spaced apart from each other by a width corresponding to a width of one of the plurality of cores, each of the first pole arm and the second pole arm having a first side facing the circumferential surface of the rotor,
 wherein the pole shoes include (i) a first pole shoe disposed at the first side of the first pole arm and (ii) a second pole shoe disposed at the first side of the second pole arm, and
 wherein adjacent cores among the plurality of cores define an angle of 60 degrees between (i) a first reference line extending in the radial direction of the rotor and passing through a space between the first pole shoe and the second pole shoe and (ii) a second reference line extending along the first surfaces of the adjacent cores.

2. The motor assembly of claim 1, wherein the first surfaces of the pole shoes are symmetrical to each other with respect to the radial direction of the rotor.

3. The motor assembly of claim 2, wherein each of the plurality of cores further includes a connecting portion that connects a second side of the first pole arm to a second side of the second pole arm.

4. The motor assembly of claim 3, further comprising a motor housing that accommodates the motor therein,
 wherein the connecting portion defines a curvature corresponding to a curvature of an inner circumferential surface of the motor housing.

5. The motor assembly of claim 3, further comprising a coil that is wound around the connecting portion.

6. The motor assembly of claim 2, wherein each pole shoe of the pole shoes further has:
 a second surface that extends from a first end of the first surface toward one of the pole arms that extends from the pole shoe; and
 a third surface that extends from a second end of the first surface along the circumferential surface of the rotor and defines a curvature corresponding to the circumferential surface of the rotor.

7. The motor assembly of claim 6, wherein adjacent cores among the plurality of cores define a first angle between the second surfaces of the adjacent cores, and
 wherein the first angle is greater than the angle that is defined between (i) the first reference line extending in the radial direction of the rotor and passing through a space between the first pole shoe and the second pole shoe and (ii) the second reference line extending along the first surfaces of the adjacent cores.

8. The motor assembly of claim 1, wherein a width of each of the first surfaces is less than a width of each of the pole arms.

9. The motor assembly of claim 1, further comprising a coil that is wound around each of the first pole arm and the second pole arm.

10. A motor assembly comprising:
 a motor configured to rotate a shaft;
 a rotor coupled to the shaft; and
 a plurality of cores arranged along a circumferential surface of the rotor and configured to define a magnetic path,
 wherein each of the plurality of cores includes:
  pole shoes that are spaced apart from the circumferential surface of the rotor and surround at least a portion of the circumferential surface of the rotor, and
  pole arms that respectively extend outward from the pole shoes in a radial direction of the rotor,
 wherein the pole shoes of adjacent cores among the plurality of cores respectively have surfaces that face each other and are parallel to a virtual reference line orthogonal to the shaft, the surfaces being symmetrical to each other with respect to the virtual reference line,
 wherein the pole arms include a first pole arm and a second pole arm that are spaced apart from each other by a width corresponding to a width of one of the plurality of cores, each of the first pole arm and the second pole arm having a first side facing the circumferential surface of the rotor,
 wherein the pole shoes include a first pole shoe disposed at the first side of the first pole arm, and a second pole shoe disposed at the first side of the second pole arm, and
 wherein adjacent cores among the plurality of cores define an angle of 60 degrees between (i) a first reference line extending in the radial direction of the rotor and passing through a space between the first pole shoe and the second pole shoe and (ii) a second reference line extending along the first surfaces of the adjacent cores.

11. The motor assembly of claim 10, wherein each of the plurality of cores further includes a connecting portion that connects a second side of the first pole arm to a second side of the second pole arm.

12. The motor assembly of claim 11, further comprising a motor housing that accommodates the motor therein,
 wherein the connecting portion defines a curvature corresponding to a curvature of an inner circumferential surface of the motor housing.

* * * * *